United States Patent [19] [11] Patent Number: 5,943,067
Kong [45] Date of Patent: Aug. 24, 1999

[54] REUSABLE MEDIA INKJET PRINTING SYSTEM

[75] Inventor: Yuan Kong, Vancouver, Wash.

[73] Assignee: Hewlett-Packard Company, Palo Alto, Calif.

[21] Appl. No.: 08/845,862

[22] Filed: Apr. 28, 1997

[51] Int. Cl.[6] ........................................................ B41J 2/01
[52] U.S. Cl. ................................ 347/2; 347/16; 347/101; 347/111; 346/21; 349/12; 428/1
[58] Field of Search .................................. 347/2, 16, 101, 347/111; 346/21; 349/12; 428/1

[56] References Cited

U.S. PATENT DOCUMENTS

| 3,695,870 | 10/1972 | Wakabayashi et al. | 347/111 |
| 4,261,799 | 4/1981 | Anizan et al. | 346/21 |
| 4,413,266 | 11/1983 | Aviram et al. | 346/21 |
| 4,617,580 | 10/1986 | Miyakawa | 347/16 |
| 4,933,243 | 6/1990 | Hara et al. | 428/1 |
| 5,049,904 | 9/1991 | Nakamura et al. | 347/49 |
| 5,351,143 | 9/1994 | Sato et al. | 359/51 |
| 5,545,381 | 8/1996 | Iida et al. | 347/101 |
| 5,574,538 | 11/1996 | Takahashi et al. | 347/101 |
| 5,658,699 | 8/1997 | Iijima et al. | 430/20 |

OTHER PUBLICATIONS

Spruce and Pringle, "Polymer dispersed liquid crystal (PDLC) films," Electronics & Communication Engineering Journal, Apr. 1992, pp. 91–100.
Doane, Yang and Chien, "Current Trends in Polymer Dispersed Liquid Crystals," IEEE Liquid Crystal Institute, 1991, pp. 175–178.
Tannas, "Evolution of Flat–Panel Displays," Proceedings of the IEEE, vol. 82, No. 4, Apr. 1994, pp. 499–509.
Malinovsky, "The Prospects of Ferroelectrics Applications," IEEE Institute of Automation and Electrometry, 1991, pp. 11–13.
Funfschilling and Schadt, "Short Pitch Bistable Ferroelectric (SBF) Liquid Crystal Displays," IEEE, 1991, pp. 183–185.
Uchida, "Present and Future Trend of Electron Device Technology in Flat Panel Display," IEDM 91–5, Sep. 1991, pp. 1.2.1–1.2.6.
Shrout and Swarts, "Processing of Ferroelectric and Related Materials: A Review," IEEE, Sep. 1992, pp. 80–88.
Kinney and Gealy, "Memory Applications of Integrated Ferroelectric Technology," ISSCC94, Session 16/ Technology Directions: Memory, Packaging, Jul. 1994, pp. 266–267.
Yang, "Transformation Characteristic on Flexible Ferroelectrics," IEEE, 1991, pp. 419–421.
Buzak, "Plasma Addressing for Flat–Panel Displays," IEEE Circuits and Devices, 1990, pp. 14–17.
Yang, Chien and Doane, "Cholesteric Liquid Crystal/Polymer Gel Dispersion Bistable at Zero Field," IEEE, Aug. 1991, pp. 49–52.

(List continued on next page.)

Primary Examiner—Valerie Lund
Attorney, Agent, or Firm—Flory L. Martin

[57] ABSTRACT

A reusable media printing system is provided for temporarily printing an image to a reusable print media having a changeable property that changes the optical appearance of the reusable print media when exposed to a physical effect. A reusable media printhead installed in a printing mechanism, preferably in place of an inkjet printhead, selectively exposes the reusable print media to this physical effect in response to a firing signal generated by a controller to change the optical appearance of the reusable print media to display the image for viewing. A reusable print media, a method of making the reusable media, and a reusable media cartridge are also provided. A method is provided for printing a temporary image to a reusable print media. The reusable printhead may be a stationary, page-wide array or a replaceable cartridge carried by a carriage mechanism across a printzone adjacent the reusable media.

28 Claims, 4 Drawing Sheets

OTHER PUBLICATIONS

Crawford, Fiske, Silverstein, "Reflective Color Displays for Imaging Applications," Final Program and Proceedings of the Third IS&T/SID Color Imaging Converence. Color Science, Systems and Applications, Nov. 10, 1995, abstract.

Crawford, "Reflective Liquid Crystal Display Materials: Liquid Crystal–Polymer Dispersions," 27th International SAMPE Technical Conference, Diversity into the Next Century, vol. 27, Oct. 12, 1995 (abstract only).

Merck Liquid Crystals Licrilite Technical Paper, Dec. 1995.

Coates, "An Introduction to Polymer Dispersed Liquid Crystals," Dec. 1995, pp. 6–20.

Merck Industrial Chemicals, "Liquid Crystals and Polymers," Dec. 1995, pp. 22–34.

Fabia Engineering, "Ferroelectric Liquid Crystals Spatial Light Modulators," 1992.

Yang, Huang, Zhu, "Bistable Cholesteric Reflective Displays: Materials and Drive Schemes" Chemical Physics Program and Liquid Crystal Institute.

REUSABLE MEDIA INKJET PRINTING SYSTEM

FIELD OF THE INVENTION

This invention relates generally to printing using an inkjet printing mechanism, and more particularly to a reusable media that replaces paper for printing in a modified inkjet printing mechanism, and to a printing system and method for using this revolutionary reusable media.

BACKGROUND OF THE INVENTION

Inkjet printing mechanisms use cartridges, often called "pens," which shoot drops of liquid colorant, referred to generally herein as "ink," onto a page. Each pen has a printhead formed with very small nozzles through which the ink drops are fired. To print an image on paper media, for instance, the printhead is propelled back and forth across the page, shooting drops of ink in a desired pattern as it moves. The particular ink ejection mechanism within the printhead may take on a variety of different forms known to those skilled in the art, such as those using piezo-electric or thermal printhead technology. For instance, two earlier thermal ink ejection mechanisms are shown in U.S. Pat. Nos. 5,278,584 and 4,683,481, both assigned to the present assignee, Hewlett-Packard Company. In a thermal system, a barrier layer containing ink channels and vaporization chambers is located between a nozzle orifice plate and a substrate layer. This substrate layer typically contains linear arrays of heater elements, such as resistors, which are energized to heat ink within the vaporization chambers. Upon heating, an ink droplet is ejected from a nozzle associated with the energized resistor. By selectively energizing the resistors as the printhead moves across the page, the ink is expelled in a pattern on the print media to form a desired image (e.g., picture, chart or text).

To clean and protect the printhead, typically a "service station" mechanism is mounted within the printer chassis so the printhead can be moved over the station for maintenance. For storage, or during non-printing periods, the service stations usually include a capping system which hermetically seals the printhead nozzles from contaminants and drying. Some caps are also designed to facilitate priming, such as by being connected to a pumping unit that draws a vacuum on the printhead. During operation, clogs in the printhead are periodically cleared by firing a number of drops of ink through each of the nozzles in a process known as "spitting," with the waste ink being collected in a "spittoon" reservoir portion of the service station. After spitting, uncapping, or occasionally during printing, most service stations have an elastomeric wiper that wipes the printhead surface to remove ink residue, as well as any paper dust or other debris that has collected on the printhead.

Over the last decade or so, hardcopy printing has rapidly become an affordable technology in our every day life for outputting various different types of computer-generated information. The most common print media is paper, although other media are often used, such as transparencies, foil, and fabric, to name a few. For instance, paper media is printed upon and used as a reminder for information.

Despite the advances in electronic information display technology, the use of paper as a hardcopy print media has shown no signs of decline. Indeed, the trend has been toward improving the print media to improve the print quality of the final image, as well as researching new types of hardcopy print media, such as photo-quality paper and printable fabric. Still, thus far, the hardcopy printing technology has focused on providing a permanent print output, while neglecting situations where a reusable printing technology may be preferred. For example, it may be desirable to print a hardcopy output of various reoccurring information, such as printing the current day's news or the daily stock prices from a computer website location. Other situations where reusable media may be preferred are as simple as an electronic mail message from a friend that one would like to share with family, or simply a draft of an article or report that one would like to proofread. It is apparent that there are many different situations where it would be helpful to have hardcopy in hand to read, but a permanent copy of the information is simply not required.

Thus, from both an economical and an environmental point of view, it would be desirable in this information age to have a system for temporarily recording information on a familiar hardcopy output, without later throwing the hardcopy away, wasting both ink and the media, which is typically paper. Granted, paper is recycled today in many homes and offices to lessen the waste of disposing the hardcopy output. Unfortunately, recycling paper has several economic and environmental side effects, such as the additional air pollution caused by vehicles hauling the waste media to the recycling center, as well as the consumption of fossil fuels used to power these vehicles. Furthermore, additional energy, often in the form of electrical energy, is required to process the waste paper at the recycling plant. Thus, it would be desirable to have a reusable media that avoids wasting media and conventional recycling.

One approach recently advertised by the E.I. DuPont de Nemours and Company of Willmington, Del., is an electronic journal display. Here, the user must connect a cable between the computer output and the journal display device. After making this connection, the computer then downloads the information into the journal display device where the information is stored for later reading at a remote site. This journal display device may be useful for reading newspapers and other periodicals, but unfortunately, it is cumbersome to use, requiring the repeated coupling and uncoupling of the cable each time new material is downloaded. Furthermore, a totally separate piece of equipment is required beyond that found in the normal office environment. Thus, it would be desirable to provide a printing mechanism, such as an inkjet printer, which is capable of printing both a permanent record on a single-use or "permanent" print media such as paper, and a temporary image on a reusable print media.

SUMMARY OF THE INVENTION

According to one aspect of the invention, a printing system is provided for temporarily printing an image to a reusable print media having a changeable property that changes the optical appearance of the reusable print media when exposed to a physical effect. The printing system has a chassis and a reusable media printhead supported by the chassis to expose the reusable print media to said physical effect in response to a firing signal to change the optical appearance of the reusable print media to display the image for viewing. The printing system also has a controller that generates the firing signal to print the image to the reusable print media.

In an illustrated embodiment, the printing system comprises an inkjet printing mechanism having an inkjet printhead that is interchangeable with the reusable media printhead, allowing a user to print with inkjet ink on a surface of a print media or to print a temporary image on the reusable print media. In the illustrated embodiments, the printheads may be stationary page-wide arrays or replaceable cartridges carried by a carriage mechanism across a printzone adjacent the media.

According to further aspects of the invention, a reusable media cartridge, as well as a reusable print media, are provided for use in the printing systems described above.

According to an additional aspect of the invention, a method is provided for making a reusable print media that temporarily displays an image after exposure to a physical effect generated in a printzone by a printing mechanism. The method includes the step of supplying a base layer and a changeable layer, with the changeable layer comprising a material having a changeable property that changes the optical appearance of the reusable print media to display the image when exposed to said physical effect by the printing mechanism. In a bonding step, the changeable layer is bonded to the base layer as a flexible sheet for feeding through the printzone of the printing mechanism.

According to yet another aspect of the invention, a method is provided for printing a temporary image to a reusable print media. The method includes the step of installing a reusable media printhead in a printing mechanism having a printzone. Thereafter, in a feeding step, a reusable print media is fed through the printzone, with the reusable media having a changeable property that changes the optical appearance of the reusable print media when exposed to a physical effect. In a generating step, the physical effect is selectively generated in the printzone with the reusable media printhead to change the optical appearance of the reusable print media to display the image for viewing.

An overall goal of the present invention is to provide a reusable media for use in an inkjet printing mechanism to temporarily display an image.

Another goal of the present invention is to provide an inkjet printing mechanism that prints on both permanent media, such as paper, and on a reusable media.

A further goal of the present invention is to provide a method of making a temporary image on a reusable media, along with a method of making such a reusable media.

An additional goal of the present invention is to provide a reusable media cartridge that may be used in an inkjet printing mechanism in addition to, or as a replacement for, an inkjet cartridge, in either a reciprocating cartridge format or in a page-wide array format.

DETAILED DESCRIPTION OF THE PREFERRED EMBODIMENTS

Figure 1:
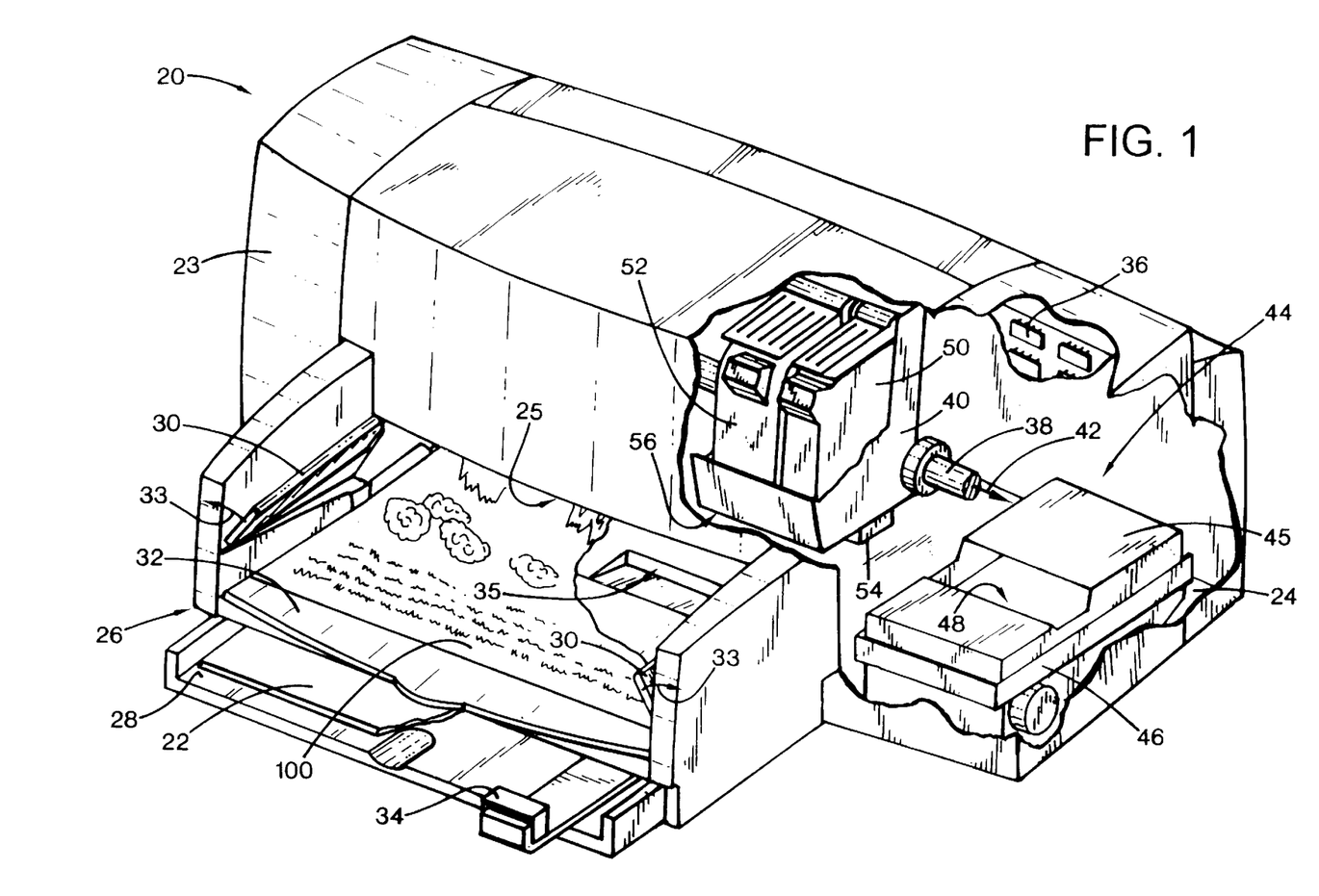
FIG. 1 is a partially schematic, fragmented, perspective view of one form of an inkjet printing mechanism, here shown as an inkjet printer, for printing with inkjet ink on single-use media using an inkjet cartridge and for printing on reusable media with a reusable media cartridge.

FIG. 1 illustrates an embodiment of an inkjet printing mechanism, here shown as an inkjet printer 20, constructed in accordance with the present invention, which may be used for printing for business reports, correspondence, desktop publishing, and the like, in an industrial, office, home or other environment. A variety of inkjet printing mechanisms are commercially available. For instance, some of the printing mechanisms that may embody the present invention include plotters, portable printing units, copiers, cameras, video printers, and facsimile machines, to name a few. For convenience the concepts of the present invention are illustrated in the environment of an inkjet printer 20.

A permanent print media 22 may be used by printer 20 to produce permanent hardcopy outputs. This permanent print media 22 may be any type of suitable sheet material, such as paper, card-stock, transparencies, mylar, fabric, etc., but for convenience, the illustrated embodiment is described using paper as a permanent print medium. As used herein, the term "permanent print medium" means one that typically holds an image printed on an exterior surface of the medium until the print medium is destroyed. Of course, some inks may be erased to partially or fully remove an image from the surface of the medium 22. Thus, this definition of "permanent print medium" ignores this familiar concept of erasing an image from the surface of the media 22, and refers generally to single-use media which is typically intended to be used for printing only once, or unless erased, for carrying the final printed image, which may be a composite of several printing episodes as in the case of printing data on pre-printed forms, until the media is destroyed.

While it is apparent that the printer components may vary from model to model, the typical inkjet printer 20 includes a housing or casing enclosure 23, typically of a plastic material, which surrounds a chassis 24. Sheets of print media are fed through a printzone 25 by a print media handling system 26, constructed in accordance with the present invention. The print media handling system 26 has a feed tray 28 for storing sheets of media before printing. A series of conventional motor-driven media drive rollers (not shown) may be used to move the print media from tray 28 into the printzone 25 for printing. After printing, the sheet then lands on a pair of retractable output drying wing members 30, shown extended to receive a printed sheet. The wings 30 momentarily hold a newly printed sheet above any previously printed sheets, which may still have ink drying, in an output tray 32. After this momentary holding period, the wings 30 pivotally retract to the sides, as shown by curved arrows 33, to drop the newly printed sheet into the output tray 32. The media handling system 26 may include a series of adjustment mechanisms for accommodating different sizes of print media, including letter, legal, A-4, envelopes, etc., such as a sliding length adjustment lever 34, and an envelope feed slot 35.

The printer 20 also has a printer controller, illustrated schematically as a microprocessor 36, that receives instructions from a host device, typically a computer, such as a personal computer (not shown). Indeed, many of the printer controller functions may be performed by the host computer, by the electronics on board the printer, or by interactions therebetween. As used herein, the term "printer controller 36" encompasses these functions, whether performed by the host computer, the printer, an intermediary device therebetween, or by a combined interaction of such elements. The printer controller 36 may also operate in response to user inputs provided through a key pad (not shown) located on the exterior of the casing 23. A monitor coupled to the computer host may be used to display visual information to an operator, such as the printer status or a particular program being run on the host computer. Personal computers, their input devices, such as a keyboard and/or a mouse device, and monitors are all well known to those skilled in the art.

A carriage guide rod 38 is supported by the chassis 24 to slideably support an inkjet carriage 40 for travel back and forth across the printzone 25 along a scanning axis 42 defined by the guide rod 38. One suitable type of carriage support system is shown in U.S. Pat. No. 5,366,305, assigned to Hewlett-Packard Company, the assignee of the present invention. A conventional carriage propulsion system may be used to drive carriage 40, including a position feedback system, which communicates carriage position signals to the controller 36. For instance, a carriage drive gear and DC motor assembly may be coupled to drive an endless belt secured in a conventional manner to the pen carriage 40, with the motor operating in response to control signals received from the printer controller 36. To provide carriage positional feedback information to printer controller 36, a conventional optical encoder reader may be mounted to carriage 40 to read an encoder strip extending along the path of carriage travel.

The carriage 40 is also propelled along guide rod 38 into a servicing region, as indicated generally by arrow 44, located within the interior of the casing 23. The servicing region 44 houses a service station 45, which may provide various inkjet printhead servicing functions. For example, a service station frame 46 may support a group of printhead servicing appliances, such as wipers for cleaning the printheads, caps for sealing the printheads during periods of inactivity, and primers for removing ink clogging the printhead nozzles. In FIG. 1, a spittoon portion 48 of the service station is shown as being defined, at least in part, by the service station frame 46. Ink is periodically purged from the printhead nozzles by ejecting the ink into the spittoon 48 through a process called "spitting," which typically refers to the ejection of ink for servicing purposes rather than for printing.

When fed through the printzone 25, the permanent media sheet 22 receives ink from an inkjet cartridge, such as a black ink cartridge 50 and/or a color ink cartridge 52. The cartridges 50 and 52 are also often called "pens" by those skilled in the art. The illustrated color pen 52 is a tri-color pen, although in some embodiments, a set of discrete monochrome pens may be used. While the color pen 52 may contain a pigment based ink, for the purposes of illustration, pen 52 is described as containing three dye based ink colors, such as cyan, yellow and magenta. The black ink pen 50 is illustrated herein as containing a pigment based ink. It is apparent that other types of inks may also be used in pens 50, 52, such as thermoplastic, wax or paraffin based inks, as well as hybrid or composite inks having both dye and pigment characteristics.

The illustrated pens 50, 52 each include reservoirs for storing a supply of ink. The pens 50, 52 have printheads 54, 56 respectively, each of which have an orifice plate with a plurality of nozzles therethrough which may be formed in a manner well known to those skilled in the art. The illustrated printheads 54, 56 are thermal inkjet printheads, although other types of printheads may be used, such as piezoelectric printheads. The printheads 54, 56 typically include a substrate layer having a plurality of resistors which are associated with the nozzles. Upon energizing a selected resistor, a bubble of gas is formed to eject a droplet of ink from the nozzle and onto media in the printzone 25. The printhead resistors are selectively energized in response to enabling or firing command control signals, which may be delivered by a conventional multi-conductor strip (not shown) from the controller 36 to the printhead carriage 40, and through conventional interconnects between the carriage and pens 50, 52 to the printheads 54, 56.

Reusable Media

Figure 2:
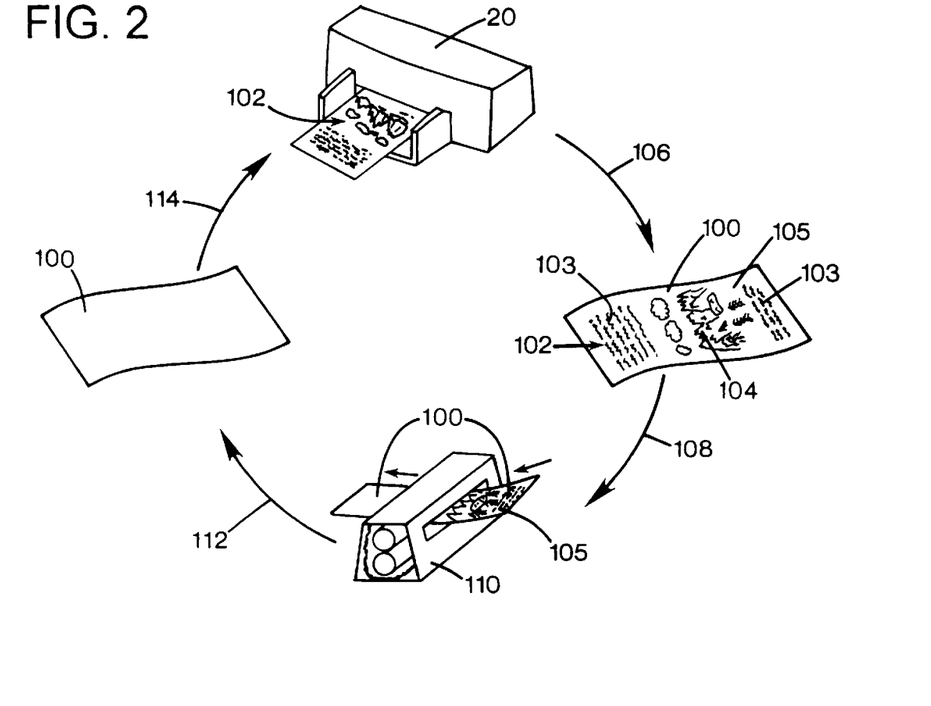
FIG. 2 is a schematic flow diagram of one form of a method of printing using the reusable media of FIG. 1.

Since the conventional printing process uses an ink that interacts with a print media, previous approaches for making conventional media reusable typically called for an erasure of the ink from the media. One simple manner of erasing the ink is to use a typical pencil eraser, while a more complex system may use a chemical process. Referring to FIG. 2, rather than applying an ink to the surface of a media to record an image, a reusable media 100, constructed in accordance with the present invention, has physical properties which may be altered by a physical technique to display a desired information or image 102. For instance, image 102 includes text 103 and graphics 104, which when printed to media 100 together provide a desired hardcopy output 105.

If the physical properties of the media 100 are changed through a physical technique applied by printer 20 to form image 102, then these physical properties must be reversed or otherwise altered afterward in order to reuse the media 100. FIG. 2 shows the printer 20 in the process of printing image 102, then following the curved arrow 106, the hardcopy output 105 is shown in its entirety ready for reading. After reading, following arrow 108 in FIG. 2, the reusable media 100 is then inserted through an erasure mechanism 110. The media 100 is shown traveling from right to left through the erasure mechanism 110, with the remainder of the image 102 being shown to the right, and with the erased or refreshed media 100 emerging to the left from mechanism 100. Then, following arrow 112, the now blank sheet of media 100 is shown, ready for insertion into the input tray of printer 20, as indicated in FIG. 2 by arrow 114. Indeed, while a separate erasure mechanism 110 is illustrated, it may be preferable to configure the printer 20 to perform the erasure, eliminating the need for separate erasing mechanism 110.

The physical effects employed by printer 20 to place image 102 on the reusable media 100 may take a variety of different forms, such as through electric means, heating means, or magnetic means. For example, an electric physical effect may be used with a ferroelectric material imbedded within media 100, with the ferroelectric material selected to have optic properties which are changeable depending upon the electrical stimulus supplied by printer 20. When using heat as the physical effect, the media 100 may have a pyroelectric property where the optic properties of the media 100 are temperature dependent, so upon exposing the media to point sources of a different temperature, the media property is changed to display the image 102. A magnetic physical effect may be used when media 100 has a magnetophresis property that changes optic states upon exposure to a magnetic field.

Figure 3:
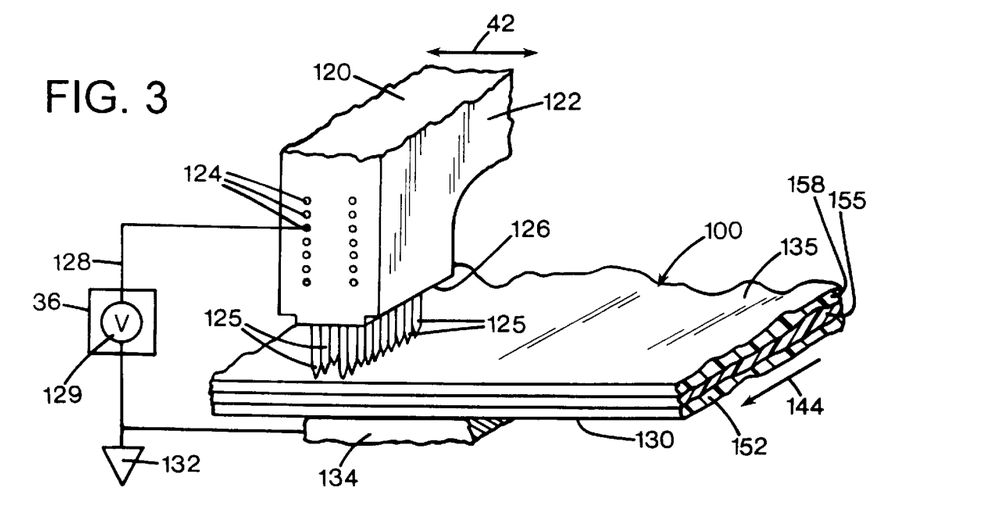
FIG. 3 is a partially schematic, fragmented, enlarged perspective view of one form of a reusable media cartridge shown printing on the reusable media of FIG. 1.

These principals of changing the physical properties of the media 100 to display image 102 will be illustrated using a bi-stable ferroelectric material as the core composition of the reusable media 100, and reusable media cartridge, here shown in FIG. 3 as a modified electrode cartridge or pen 120. The electrode pen 120 preferably has an exterior body 122 which is of the same size and configuration as one of the inkjet cartridges 50, 52. For instance, assuming the reusable media 100 is a monochrome display device, then substituting the electrode pen 120 for the black inkjet pen 50 is preferred. In some implementations, multicolor reusable media may be used so substitution of the color inkjet cartridge 52 with a multicolor activating electrode cartridge may be preferred, or alternatively, both the black and color inkjet cartridges 50, 52 may be replaced by electrode pens.

The illustrated electrode pen 120 has a series of electrical interconnect contacts or pads 124 which are electrically coupled to activate an associated print electrode 125 of an electrode printhead portion 126 of the pen. For the purposes of illustration in FIG. 3, the electrodes 125 are illustrated as being two linear arrays of spikes, although in actuality, printhead 126 may have an exterior configuration similar to that of the ink ejecting printheads 54, 56. For purposes of illustration, only one of the electrode pads 124 is shown receiving a firing pulse voltage signal 128 from a voltage source portion 129 of the controller 36, which then energizes the associated electrode 125. The current path from the controller 36 through the printhead carriage 40 to the electrode pen 120 may be the same current path used for firing the inkjet printhead 50. Indeed, the construction of the electrode printhead 126 may be similar to that used for constructing an inkjet printhead, such as thermal inkjet printhead 54, except the firing resistors of the inkjet printhead 54 may be replaced with the electrodes 125 for pen 120.

In a thermal ink ejecting printhead, a current path is provided to a firing resistor housed within a bubble chamber from which ink is ejected through an orifice or nozzle as the resistor is heated. For the electrode pen 120, the printhead 126 may be constructed by replacing each ink ejecting firing resistor with an electrode 125, and by eliminating the bubble chamber needed to heat the ink in thermal inkjet printheads. Indeed, the electrode printhead 126 may be constructed from a single piece of silicon by micro machining the electrodes into the silicon, instead of forming firing resistors in the silicon to eject ink. Thus construction of the electrode printhead 126 is accomplished using currently available manufacturing techniques, which indeed may be a simpler and more economical printhead structure than printheads 54, 56 which are constructed for ejecting ink. Using such a construction technique, it is apparent that the number of electrodes 125 may be on the same order as the number of ink ejecting nozzles in printhead 54, which has two linear rays of one-hundred-fifty nozzles each. With the size of the electrodes 125 determining the size of the resulting dot or pixel which is seen on the reusable media, assuming that the media 100 is sensitive enough. Some ferroelectric material have particles on the order of one micron in size, which may be individually excited to change states, thus, the resolution of the temporary image 102 may be at least as good as the resolution of an image printed with ink on paper 22.

One variation between the inkjet printheads 54, 56 and the electrode printhead 126 is that the thermal ink ejecting printheads 54, 56 are basically current devices which draw current from the controller 36 to heat the firing resistors. In contrast, the electrode pen 120 is basically a voltage device, which selectively charges each electrode 125 with a voltage. In the illustrated example, when energized the electrode 125 polarizes the bi-stable ferroelectric material inside the reusable media 100, causing this material to change its optical state, typically between an optically transparent state and an opaque state. Thus, if an erased sheet of media 100 is basically a light color, then the associated portion of the ferroelectric material polarized by exposure to an energized electrode then changes state to a darker color. Conversely, if the base color of the erased media 100 is dark, then polarization supplied by the selective energization of electrodes 125 causes the ferroelectric material to turn a lighter color. So with a ferroelectric material having particles on the order of one micron in size, which may be individually excited to change states from transparent to opaque, from opaque to transparent (or alternatively, from light to dark, or from dark to light), and with the printhead 126 constructed with the same number of electrodes as ink ejecting nozzles of the printhead 54, then the resolution of image 102 is at least as good as the resolution of an image printed on paper 22.

Furthermore, the voltage pulses 128 may be generated by controller 36 at a speed that is at least as fast as that required to generate the current firing pulses which are supplied to the ink rejecting resistors of printhead 54. Thus, the printing speed or throughput of the printer 20, commonly rated in terms of pages-per-minute, when printing on the reusable media 100 is comparable to that of printing an image with ink on a permanent media 22. Thus, both resolution, print quality, and printing speed or throughput experienced when using the reusable media 100 are comparable to those experienced when using the ink ejecting cartridge 50 to print a permanent image on media 22.

Preferably, a lower surface 130 of the print media 100 is coupled to a ground potential 132, for instance, by supporting the underside 130 of the media with a conductive platen 134, for instance of a metallic or other conductive material. The electrodes 125 engage, or move adjacent to, an upper printing surface 135 of the media 100 during the reusable media printing process. Electrical pulses generated by the controller 36 provide a firing signal 128 to an associated electrode 125 to create an electrical field beneath across the reusable media 100 and toward the ground potential of platen 134. The media 100 has a bi-stable property that holds the print pattern 102 after exposure to the electrical field generated by electrodes 125. Then for erasure, rather than using a separate erasure device 110 (FIG. 2), application of a field of a different strength by electrodes 125 to the media 100 may be an effective way to erase a previously imparted image 102. For instance, a first voltage pulse may be the physical effect to print the image 102, whereas a second voltage pulse of a smaller magnitude than the first pulse may be used to erase the image and refreshen the media 100 for the next image.

From this discussion of the operation of the electrode pen 120 which imparts electrical physical effects, here a voltage, to change the optic properties of a ferroelectric material imbedded within the reusable media 100, it is apparent that similar modifications may be made to convert an inkjet cartridge 50, 52 into a reusable media cartridge capable of imparting other physical effects. For example, a reusable media cartridge may be constructed to impart: (1) a heating physical effect to a reusable media having pyroelectric properties which are temperature dependent to change the optic properties of the media when exposed to heat; (2) a magnetic physical effect to a reusable media having magneto-phresis properties which change their optical appearance upon exposure to a magnetic field generated by such a reusable printhead; or (3) other physical effects required to change the optic properties of a reusable media.

Thus, the discussion of the electrode pen 120 for use with a reusable media 100 having ferroelectric properties is by way of example only, and it is apparent that these concepts may be adapted to a variety of different bi-stable media which change state and display a different optic property in response to a physical effect supplied by a reusable media print cartridge.

Furthermore, while a bi-stable reusable media 100 is described herein, it is apparent that compositions having several states with varying optical properties may also be implemented, for instance, with the varying optical states being achieved by applying different levels of a physical effect to the reusable media, e.g., by applying various voltage levels using an electrode pen 120 to such a multi-state reusable media. These various multi-states may produce visual effects corresponding to the primary colors (red-blue-yellow), to a cyan-yellow-magenta (and perhaps black) color palette, or a red-green-blue (and perhaps black) color palette. Thus, full-color printing is also possible using the principals described herein.

The inkjet cartridge 50 and the electrode cartridge 120 may carry different identifiers, such as two components with different values, which the printer controller 36 senses along a signal path traveling through the carriage 40 as do the firing signals 128, to determine whether the inkjet cartridge 50 or the electrode cartridge 120 is installed in carriage 40. For example, the inkjet cartridge 50 may have an identification resistor with a value on the order of 10 ohms, whereas the electrode cartridge 120 may have a similarly situated resistor but with a value on the order of 100 ohms. It is apparent that other identifiers may also be used, such as a digitally encoded number or other identifier embedded into the electronics of the printheads 54, 126. In response to this identification, the printer controller 36 then generates a current pulse to fire the inkjet printhead resistors, and voltage signals 128 to energize the electrodes 125.

Figure 4:
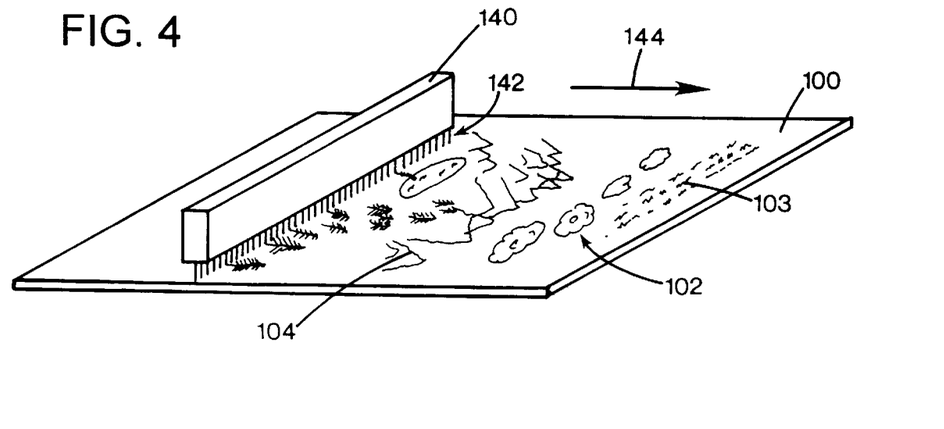
FIG. 4 is a perspective view of an alternate form of a reusable media cartridge shown printing on the reusable media of FIG. 1, here shown as a pagewide array cartridge rather than the reciprocating reusable media cartridge of FIG. 3.

Thus far, the reusable media cartridge 120 has been illustrated as a reciprocating cartridge, which is carried back and forth across the printzone 25 by carriage 40 as it traverses along the guide rod 38. FIG. 4 shows an alternate embodiment of a pagewide array reusable media cartridge 140 which may be employed by modifying a pagewide array inkjet printer, such as that described in U.S. Pat. No. 5,589,865, assigned to the present assignee, the Hewlett-Packard Company. In a pagewide array printing apparatus, the reusable media printhead 140, which may be interchangeable with, or mounted along side an ink-ejecting pagewide array printhead, is supported by the printer chassis 24 in a fixed position above the printzone 25. The media handling system 26 of the printer advances the media 22, 100 through the printzone 25, as indicated by arrow 144 in FIG. 4. As the media passes under the pagewide printhead, the printer controller 36 selectively ejects ink for printing on permanent media 22 when the inkjet pagewide array printhead is installed, and selectively fires electrodes 142 to form image 102 on the reusable media 100 when the reusable media pagewide array printhead 140 is in use. It is apparent that while the reusable media pagewide printhead 140 is illustrated as having electrodes 142 for use with a ferroelectric reusable media 100, the pagewide printhead 140 may be modified to use heat to produce an image on a reusable media having pyroelectric properties, or to produce a magnetic field to produce an image on reusable media having magneto-phresis properties, as well as to produce other physical effects to alter other reusable print media having bi-stable or multi-stable properties. The various other modifications described above with respect to the reciprocating electrode cartridge 120 may be applied to the pagewide array cartridge 140.

Figure 5:
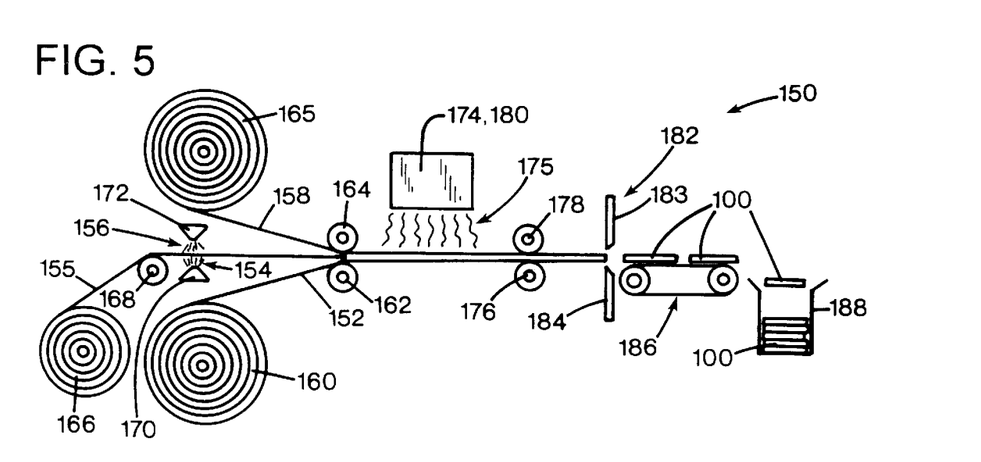
FIG. 5 is a schematic flow diagram of one form of a method of making the reusable media of FIG. 1.

Having now described various ways in which the printing mechanism 20 may be modified to print ink on permanent media 22, as well as to print on reusable media 100, including ways to erase the image 102 from media 100, attention will now be given to one manner of making a sheet of reusable media 100. FIG. 5 illustrates one form of a manufacturing process 150 for constructing reusable media 100, a cross-sectional portion of which is shown enlarged in FIG. 6. The basic elements of the reusable media 100 include two core layers, with one being a conductive substrate layer 152 which is bonded, for instance using a thin adhesive layer 154, to a second core layer which comprises an opto-variable layer 155. The opto-variable layer 155 changes its optical appearance upon exposure to different physical effects provided by the reusable media cartridges 120, 140. In the illustrated embodiment, this opto-variable layer 155 is a bi-stable ferroelectric material, such as the liquid crystal material that may be used in flat panel displays. The reusable media 100 may also have a second adhesive layer 156, or other bonding mechanism, which attaches an optional protective cover layer 158 to the opto-variable layer 155.

Figure 6:
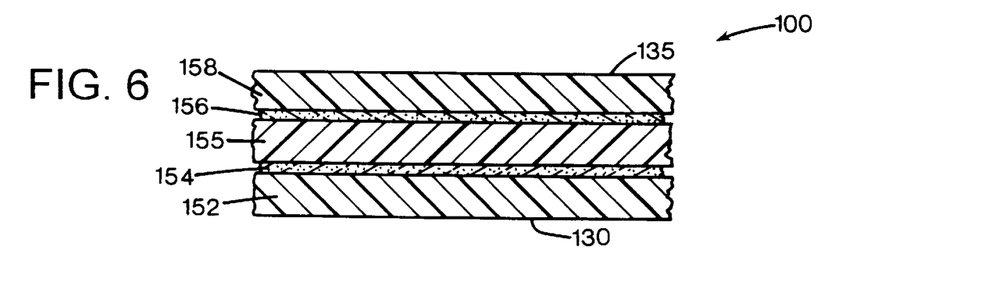
FIG. 6 is a cross sectional view of a portion of the reusable media of FIG. 1.

A variety of different materials may be used for the layers which make up the reusable media 100. In the illustrated embodiment, the cover layer 158 is preferably a transparent flexible sheet of an insulating material which, while not conducting electricity from an electrode, does indeed become polarized by energization of a nearby electrode 125, 142 which then causes the portion of the opto-variable layer 155 thereunder to become polarized and change states, e.g. from light to dark, from dark to light, or from a neutral to a color. For example, the optional transparent insulating cover layer 158 may preferably be of a flexible, transparent, insulating, polarizable, abrasion-resistant plastic sheet, such as a thin version of the transparency material upon which images are often printed for projection on a screen using an overhead viewer. The conductive substrate layer 152 is preferably a flexible conductive material with reflective properties that allows light passing through the cover layer 158 and through portions of the opto-variable layer 155 to be reflected back to the eyes 200 of a reader (see FIG. 8). Suitable materials for the substrate 152 include metallic conductors, such as copper, or semi-conductive materials, such as carbon. It is apparent that the conductive substrate 152 need not be a pure layer of carbon or copper, or other conductor, but may be a composite layer having suitable proportions of conductive material mixed therein to impart an overall conductive property to the substrate 152. The illustrated opto-variable layer 155 is constructed of a ferroelectric material, such as the liquid crystal material that is used in flat panel displays, with these various materials being discussed in greater detail below.

FIG. 5 illustrates one manner of assembling the sandwiched layers of the reusable media 100 shown in FIG. 6. In FIG. 5, the conductive substrate 152 is supplied from a roll 160 to a pair of pinch rollers 162, 164. The optional cover layer 158 is supplied to the pinch rollers 162, 164 from a roll 165. The opto-variable layer 155 is supplied to the pinch rollers 162, 164 from a roll 166. Before reaching the pinch rollers 162, 164, the opto-variable layer 155 passes over a guide roller 168 which supports layer 155 while receiving sprayed adhesive 154, 156 from adhesive dispensers 170, 172, respectively. An optional heating unit 174 may be used to apply heat 175 to the media sandwich to help cure the adhesive layers 154, 156 in a region between the first set of pinch rollers 162, 164 and a second set of pinch rollers 176 and 178. Of course, rather than spraying on adhesive layers 154, 156, they may be provided as a portion of any of the layers 152, 155 or 156, using a release paper to separate the adhesive from the next layer on rolls 160, 166 or 165, respectively. The various manners of spooling away such a release paper is well known to those skilled in the art.

Instead of using adhesive 154, 156 to bond layers 152, 155 and 158 together, other bonding mechanisms may be used. For example, the heater 174 may be replaced with an ultrasonic bonding device 180, which directly and ultrasonically bonds layers 152, 155 and 158 together. Indeed, such alternate mechanisms for bonding together the layers 152, 155 and 158 may be preferred, particularly in the region of the interface between the opto-variable layer 155 and the conductive substrate 152, where the smallest possible gap is preferred to reduce the voltage levels required by electrodes 125, 142 to cause the opto-variable layer 155 to change states. After passing through the final pinch rollers 176 and 178, the bonded media sandwich may be cut into sheets 100 by a severing unit 182. The severing unit 182 may be a pair of cutting knives 183 and 184 as illustrated, or by other severing devices known to those skilled in the art, such as through laser cutting techniques or by using a water jet severing unit. The severed media sheets 100 may then be transported, for instance, by a conveyer belt assembly 186 to a collection hopper 188.

Figure 7:
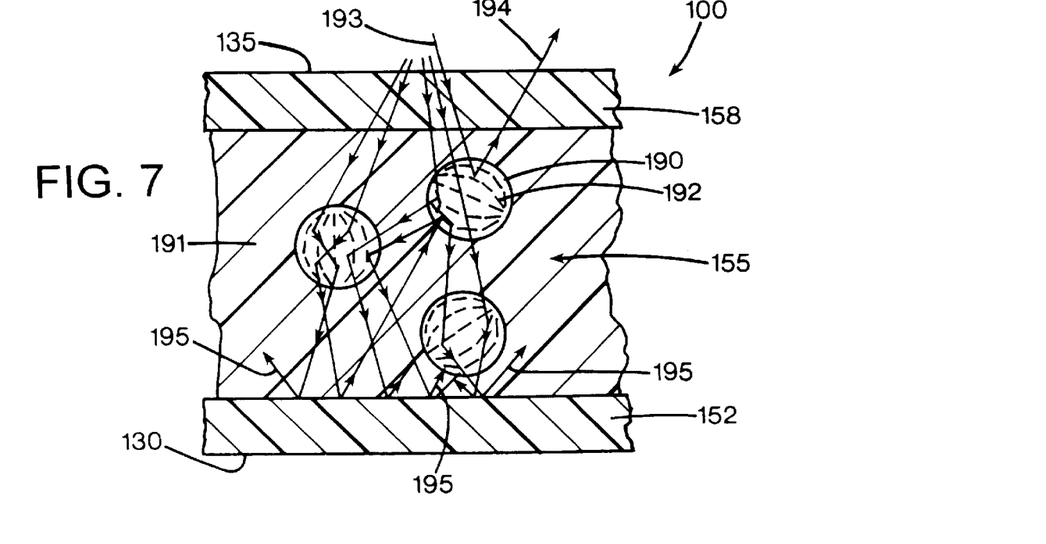
FIG. 7 is an enlarged cross sectional view of a portion of one form of the reusable media of FIG. 1, here having an opto-variable layer of a liquid crystal material shown in an erased state.
Figure 8:
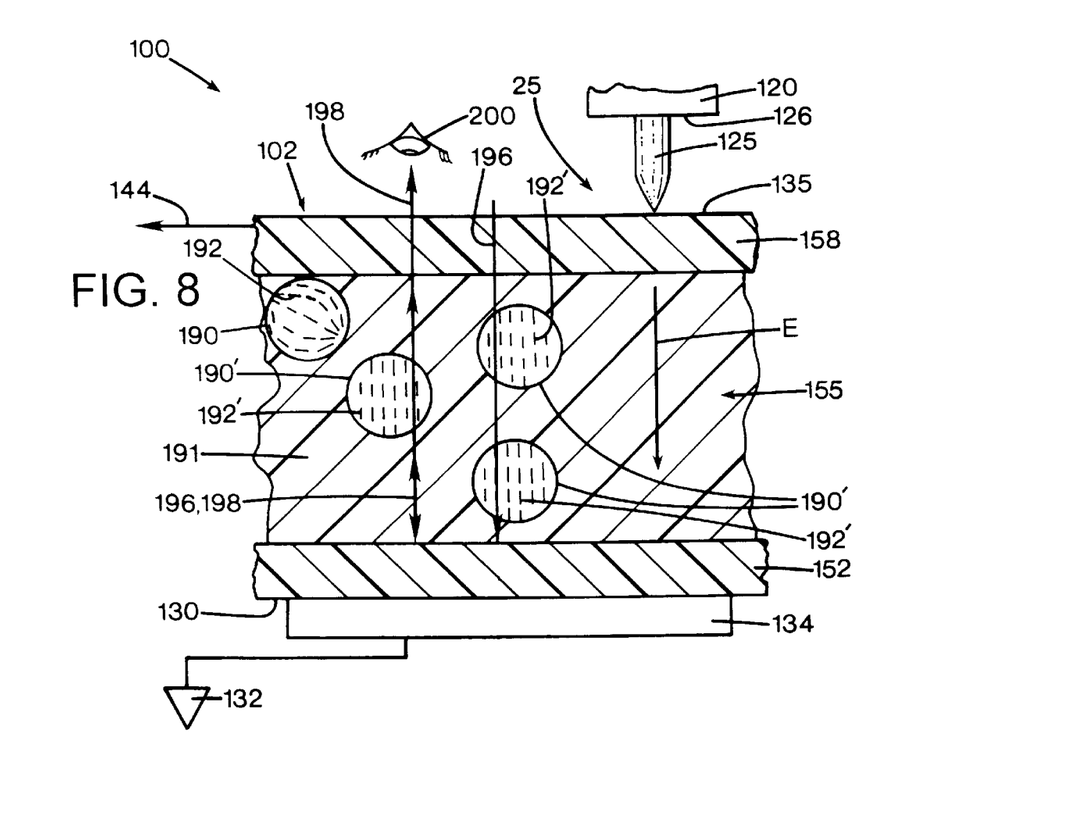
FIG. 8 is an enlarged cross sectional view of the reusable media of FIG. 7, here shown during printing an image.

FIGS. 7 and 8 illustrate an erased reusable media sheet (FIG. 7) and printing of the image 102 on the sheet 100 (FIG. 8) constructed using a polymer dispersed crystal (PDLC) film as the opto-variable layer 155. Polymer-based ferroelectric crystal materials tend to be bi-stable in that they have memory effects. A PDLC film uses liquid crystal microdroplets 190 dispersed in a matrix 191 of a polymer gelatinous material (a polymer gel). As shown in FIG. 7, in an "off" state the liquid crystals droplets 190 contain a series of light directors 192 which randomly scatter incoming unpolarized light beams 193. Incoming light rays 193 which hit a director 192 are randomly reflected as rays 194, with any light rays hitting the reflective surface of the substrate 152 being reflected as rays 195, which are again randomly scattered upon encountering the unaligned light directors 192.

In FIG. 8, after selective application of an electric field E comprising a voltage pulse by electrodes 125, all of the directors within each affected liquid crystal droplet are aligned to allow light to pass there through, as indicated by the item numbers 190' and 192'. For example, using an opto-variable layer 155 of a liquid crystal material that is a few microns thick (e.g. 2–5 microns), this voltage pulse may be on the order of 40 volts D.C. (direct current voltage) across the opto-variable layer 155 to produce a bright image, or on the order of about 20 volts D.C. across the opto-variable layer 155 to erase the image, assuming that layer 155 has a thickness of a few microns, e.g. 2–5 microns more or less. Upon impacting the reflective substrate 152, incoming light rays 196 are channeled through the polarized liquid crystals 190' and then reflect back from the surface of substrate layer 152 as light rays 198. The reflected light rays 198 then pass through the cover layer 158 for viewing as a pattern of on-crystals 190' and off-crystals 190 to form the image 102, which is viewable by a reader's eye 200. Once a pixel or liquid crystal 190' unit switches on, it stays on indefinitely because the polymer gel 191 of the liquid crystal material anchors the crystal molecules in place, even after power has been removed from the material. The off crystals 190 are also held in place by the polymer gel matrix 191 when no longer energized, so the image 102 remains fixed on the reusable media 100 until application of an erasing field, such as by exposure to the erasing mechanism 110.

Thus in FIG. 8, the illustrated liquid crystal material 190 in the opto-variable layer 155 aligns with the electric field E applied to the cell. This alignment of the liquid crystals 190 causes light to be reflected in certain directions for creating patterns viewable as image 102. Moderate erasing voltage pulses may cause the liquid crystals 190 to align randomly, weakly scattering light as shown in FIG. 7, and with most of the light being absorbed internally. Again, without a voltage pulse E being applied, the liquid crystals 190 maintain their last orientation, fixing the image (or a blank image) on the reusable media 100.

While FIG. 5 illustrates a sheet of opto-variable material 155 being sandwiched between the cover and base layers 158, 152, a more preferable manner of constructing the reusable media 100 may be to spray a coating of a polymer-based liquid crystal material directly on to the substrate layer 152, eliminating the need for an adhesive layer 154. Indeed, this liquid crystal material may be selected to have suitable adhesive properties to bond to not only the substrate 152, but also to the cover layer 158, thereby eliminating the need for the second adhesive layer 158, and/or eliminating any need for ultrasonic or other layer bonding techniques.

One suitable source of PDLC material for the opto-variable layer 155 is sold under the trademark LICRILITE® by Merck Ltd., Dorset, Great Britain, and distributed through E.M. Industries, Inc. of Hawthorne, N.Y. in the United States. A PDLC film having liquid crystal microdroplets 190 dispersed in a gelatinous matrix 191 advantageously does not require polarizers which are often needed in other liquid crystal devices, and which unfortunately block over half of the incident light 193, 196 impinging upon the crystal cells 190. These PDLC films are both tough and flexible, and are currently commercially available. The liquid crystal droplets 190 within the film have droplets which either transmit light (192') or scatter incident light (192) to form visual patterns within the film. Another similar suitable material for the opto-variable layer 155 is a nematic curvilinear aligned phase (NCAP) film, which operates similar to the PDLC films.

The operation and construction of both the PDLC and the NCAP films is explained in an article authored by G. Spruce and R. D. Pringle, entitled "Polymer Dispersed Liquid Crystal (PDLC) Films," which appeared in the *Electronics & Communication Engineering Journal*, pages 91–100 in April, 1992. Indeed, this article describes the construction of multi-colored displays, concepts which may be readily applied by those skilled in the art to the reusable media 100 to form color images 102, as well as monochrome or gray scale images. For instance, the PDLC material may be colored by incorporating dyes into the liquid crystals 190 and/or into the binder gel 191 used to form the film of layer 155. For instance, a high order parameter pleocheloroic dye may be added to the nematic gel 191 to produce a film having controllable scattering and controllable absorption. When erased, this film appears black, and upon exposure to an energized electrode 125, the film crystals in that region turn on to the clear, colored state as crystals 190'.

An alternate manner of providing a reusable media 100 for displaying color images uses a PDLC material with a nonpleochroic dye incorporated into the polymer matrix 191 to increase the reflections within the film, which increases the path length of the scattered light color, the light output 198 viewable by a reader's eye 200. In this system, the films may produce either colored characters in a dark background or dark characters on a colored background. Indeed, a combination system may provide an opto-variable layer 155 by placing dyes in the liquid crystals 190, and non-pleochroic dye in the binder 191 to produce a red green-blue ("RGB") based full color image 102.

Alternatively, by sandwiching several of these opto-variable layers 155 together, an image comprising the subtractive or complementary colors of cyan-magenta-yellow may be produced. Such a cyan-yellow-magenta ("CYM") based image may be particularly advantageous for use in the inkjet printer 20, which typically prints CYM colored inks; however, the printer controller 36 may accommodate conversions from a CYM data input to an RGB output (or more easily between RGB inputs and RGB outputs), because RGB to CYM conversions are the converse of color conversions normally made by the printer in from an RGB computer display screen to CYM inkjet ink print colors.

In the intervening years between the publication of this article by Spruce and Pringle to the present, the level of skill in the art of producing these various liquid crystal and other films which may be used for the opto-variable layer 155 of reusable media 100 has no doubt increased, and such principles may be implemented in constructing the reusable media 100 by those skilled in the art. While these various liquid crystal materials have been used in creating computer displays and the like, the construction of a reusable media 100 in forming images 102 thereon using an inkjet printing mechanism 20 modified with an electrode cartridge 120, 140 as a replacement for, or in addition to, a conventional printhead, such as a reciprocating printhead 54 and/or 56, is believed to be new. Moreover, the broader concept of imparting a physical effect to change a physical property of a sheet of media using an inkjet printing mechanism, using a printhead modified to apply this physical property to the media, is also believed to be new.

Conclusion

The benefits of such a reusable media system 20 where only a temporary hardcopy 105 of a document or graphics is required are many. For example, the permanent media 22, which is most often paper, no longer need be wasted when the reader is through viewing the image. As mentioned in the Background section above, while recycling of permanent print media 22 is common, there are many costs associated with this recycling effort, including transportation of the waste media to the recycling plant, as well as the energy and resources required to perform the recycling process. Moreover, even as recycling efforts increase, consumption of vast amounts of natural resources, such as trees, may be reduced by using a reusable media 100. While the reusable media printing system has been described herein as having a reusable media cartridge which is interchangeable with an inkjet cartridge in an inkjet printing mechanism, it is apparent that a stand-alone reusable media printing mechanism, without ink-printing capabilities, may also be constructed using the principles illustrated here. However, adapting an inkjet printing mechanism 20 to use both permanent media 22 when a permanent record is required, and reusable media 100 when only a temporary record is needed, gives consumers versatility and the best benefits of both systems while purchasing only one printing mechanism 20.

I claim:

1. A printing system for printing an image in inkjet ink on a surface of a print media or for temporarily printing the image to a reusable print media having a changeable property that changes the optical appearance of the reusable print media when exposed to a physical effect, the printing system comprising:

a chassis;

an inkjet printhead supported by the chassis to eject inkjet ink onto said surface of the print media in response to a first firing signal to record the image thereon;

a reusable media printhead supported by the chassis to expose the reusable print media to said physical effect in response to a second firing signal to change the optical appearance of the reusable print media to display the image for viewing; and a controller that generates the first firing signal when printing the image on the surface of said print media, and that generates the second firing signal when printing the image to the reusable print media.

2. A printing system according to claim 1, further including a carriage that carries the inkjet printhead and the reusable media printhead across a printzone to print the image.

3. A printing system according to claim 2 wherein the carriage interchangeably carries either the inkjet printhead or the reusable media printhead across the printzone.

4. A printing system according to claim 3 wherein:

the inkjet printhead has a first identifier;

the reusable media printhead has a second identifier; and the controller generates the first firing signal in response to detection of the first identifier indicating that the inkjet printhead is being carried by the carriage, and the controller generates the second firing signal in response to detection of the second identifier indicating that the reusable media printhead is being carried by the carriage.

5. A printing system according to claim 1 wherein:

the first firing signal generated by the controller comprises a current signal for the inkjet printhead; and the second firing signal generated by the controller comprises a voltage signal for the reusable media printhead.

6. A printing system according to claim 1 wherein:

the printing system further includes a media handling that advances said print media or the reusable print media through a printzone;

the inkjet printhead is stationarily supported by the chassis adjacent the printzone to print the image onto said surface of the print media when advanced through the printzone by the media handling system; and the reusable media printhead is stationarily supported by the chassis adjacent the printzone to print the image to the reusable print media when advanced through the printzone by the media handling system.

7. A printing system according to claim 6 wherein the chassis interchangeably supports either the inkjet printhead or the reusable media printhead adjacent the printzone.

8. A printing system according to claim 1 wherein:

the changeable property of the reusable print media changes from a first state to a second state when exposed to said physical effect and changes from the second state back to the first state when exposed to an erasing physical effect; and the printing system further includes an erasure mechanism that produces said erasing physical effect.

9. A printing system according to claim 8 wherein:

the printing system includes a printing mechanism;

the chassis, the inkjet printhead and the reusable media printhead are housed in the printing mechanism; and the erasure mechanism comprises a unit separate from the printing mechanism.

10. A printing system according to claim 8, wherein the erasure mechanism comprises the reusable media printhead which produces said erasing physical effect to expose the reusable media thereto when in a printzone adjacent the reusable media printhead.

11. A printing system according to claim 10, wherein said erasing physical effect produced by the reusable media printhead is substantially opposite to said physical effect produced to print the image.

12. A printing system according to claim 10 wherein:
the physical effect produced by the reusable media printhead to print the image comprises a first voltage signal of a first magnitude; and
the erasing physical effect produced by the reusable media comprises a second voltage signal of a second magnitude different from the first magnitude.

13. A printing system according to claim 1 wherein:
the changeable property of the reusable print media changes when the reusable print media is exposed to a physical effect comprising an electrical field; and
the reusable media printhead comprises an electrode printhead that generates said electrical field.

14. A printing system according to claim 13 wherein:
the printing system further includes a media support mounted to the chassis to support the reusable media in a printzone adjacent the reusable media printhead, with the media support being of a conductive material coupled to an electrical ground; and
the reusable print media comprises a substrate layer of a conductive material that is supported by the media support when in the printzone, and the reusable print media further comprises a layer of a bi-stable, ferroelectric liquid crystal material that changes the optical appearance of the reusable print media when exposed to the electrical field generated by the reusable media printhead.

15. A reusable media cartridge for use in a printing mechanism comprising an inkjet printing mechanism that produces a firing signal to temporarily print an image to a reusable print media having a changeable property that changes the optical appearance of the reusable print media when exposed to a physical effect, the reusable media cartridge comprising:
a body received by the printing mechanism; and
a reusable media printhead housed within the body to generate said physical effect in response to the firing signal when the body is received by the printing mechanism to expose the reusable print media to said physical effect to change the optical appearance of the reusable print media to display the image for viewing;
wherein the inkjet printing mechanism also receives an inkjet printhead housed in an inkjet body, and the body of the reusable media cartridge is configured to be interchanged with the inkjet body of the inkjet printhead.

16. A reusable media cartridge according to claim 1 wherein:
the inkjet printing mechanism has a carriage that reciprocates either the inkjet printhead or the reusable media cartridge along a scanning axis across a printzone; and
the reusable media printhead has an array of emitters aligned substantially perpendicular to the scanning axis, with each emitter selectively directing said physical effect to the reusable print media.

17. A reusable media cartridge according to claim 15 wherein:

the printing mechanism has a media handling that advances the reusable print media through a printzone in a first direction; and
the reusable media printhead is stationarily received by the printing mechanism adjacent the printzone to print the image to the reusable print media when advanced through the printzone by the media handling system.

18. A reusable media cartridge according to claim 17 wherein the reusable media printhead has an array of emitters extending across the printzone aligned substantially perpendicular to the first direction, with each emitter selectively directing said physical effect to the reusable print media.

19. A reusable media cartridge according to claim 15 wherein:
the changeable property of the reusable print media changes from a first state to a second state when exposed to said physical effect and changes from the second state back to the first state when exposed to an erasing physical effect; and
the reusable media printhead produces said erasing physical effect to expose the reusable media thereto.

20. A reusable media cartridge according to claim 19 wherein:
the physical effect produced by the reusable media printhead to print the image comprises a first voltage signal of a first magnitude; and
the erasing physical effect produced by the reusable media comprises a second voltage signal of a second magnitude different from the first magnitude.

21. A method of printing a temporary image to a reusable print media, comprising the steps of:
installing a reusable media printhead in an inkjet printing mechanism having a printzone;
thereafter, feeding a reusable print media through the printzone, with the reusable media having a changeable property that changes the optical appearance of the reusable print media when exposed to a physical effect;
selectively generating the physical effect in the printzone with the reusable media printhead to change the optical appearance of the reusable print media to display the image for viewing;
removing the reusable media printhead from the printing mechanism;
thereafter, installing an inkjet printhead in place of the reusable media printhead;
thereafter, feeding a print media having a printing surface through the printzone; and
printing the image in inkjet ink on the printing surface of the print media with the inkjet printhead.

22. A method according to claim 21 wherein:
the feeding step comprises feeding a reusable print media having a changeable property that changes from a first state to a second state when exposed to said physical effect and changes from the second state back to the first state when exposed to an erasing physical effect; and
the method further includes the step of erasing the displayed image by exposing reusable media to said erasing physical effect.

23. A method according to claim 22 wherein:
the installing step comprises installing a reusable media printhead that also generates the erasing physical effect; and the erasing step comprises generating the erasing physical effect with the reusable media printhead.

24. A method of printing a temporary image to a reusable print media, comprising the steps of:

installing a reusable media printhead in a printing mechanism having a printzone, with the reusable media printhead generating a physical effect comprising an electrical field;

thereafter, feeding a reusable print media through the printzone, with the reusable media a changeable property that changes the optical appearance of the reusable print media when exposed to a physical effect, wherein the reusable media has a layer of a liquid crystal material that changes the optical appearance of the reusable print media when exposed to the electrical field generated by the reusable media printhead; and selectively generating the physical effect in the printzone with the reusable media printhead to change the optical appearance of the reusable print media to display the image for viewing.

25. A method of printing a temporary image to a reusable print media comprising the steps of:

installing a reusable media printhead in a printing mechanism having a printzone, with the a reusable media printhead generating a physical effect comprising a polarizing field;

thereafter, feeding a reusable print media through the printzone, with the reusable media having a changeable property that changes the optical appearance of the reusable print media when exposed to a physical effect, wherein the reusable media has a layer of a liquid crystal material that changes the optical appearance of the reusable print media when polarized by the reusable media printhead; and selectively generating the physical effect in the printzone with the reusable media printhead to change the optical appearance of the reusable print media to display the image for viewing.

26. A printing system for temporarily printing an image to a reusable print media having a changeable property that changes the optical appearance of the reusable print media when exposed to a physical effect, the printing system comprising:

a chassis;

a reusable media printhead supported by the chassis to expose the reusable print media to said physical effect in response to a firing signal to change the optical appearance of the reusable print media to display the image for viewing;

a carriage that carries the reusable media printhead across a printzone to print the image; and a controller that generates the firing signal to print the image to the reusable print media;

wherein the printing mechanism comprises an inkjet printing mechanism having a carriage that carries at least two inkjet cartridges across the printzone for printing an image on the surface of media and the reusable media printhead is interchangeable with at least one of the inkjet cartridges to be received by the carriage.

27. A printing system according to claim 26 wherein:

the printing system further includes a media handling system that advances the reusable print media through a printzone; and the reusable media printhead is stationarily supported by the chassis adjacent the printzone to print the image to the reusable print media when advanced through the printzone by the media handling system.

28. A printing system according to claim 26 wherein:

the changeable property of the reusable print media changes from a first state to a second state when exposed to said physical effect and changes from the second state back to the first state when exposed to an erasing physical effect;

in response to an erasing signal, the reusable media printhead selectively produces said erasing physical effect to expose the reusable media thereto when in a printzone adjacent the reusable media printhead; and the controller generates the erasing signal to erase the printed image from the reusable print media.

* * * * *

UNITED STATES PATENT AND TRADEMARK OFFICE
CERTIFICATE OF CORRECTION

PATENT NO : 5,943,067
DATED : August 24, 1999
INVENTOR(S) : Kong

It is certified that error appears in the above-identified patent and that said Letters Patent is hereby corrected as shown below:

Column 8, (line 55), delete "imbedded" and insert therefor --embedded--.
Column 12, (line 55), delete "pleocheloroic" and insert therefor --pleochroic--.
Column 13, (line 4), delete "red green-blue" and insert therefor --red-green-blue--.

IN THE CLAIMS

Column 15, (line 57), delete "claim 1" and insert therefor --claim 15--.
Column 17, (line 21), after "media" insert --,--.
Column 17, (line 23), after "the" delete "a".
Column 18, (line 16), between "media" and "and" insert --,--.

Signed and Sealed this

Twenty-third Day of May, 2000

*Attest:*

Q. TODD DICKINSON

*Attesting Officer*    *Director of Patents and Trademarks*